(12) United States Patent
Harada

(10) Patent No.: US 12,127,566 B2
(45) Date of Patent: Oct. 29, 2024

(54) METHOD FOR SUPPRESSING GREENING

(71) Applicant: HOKKAIDO ELECTRIC POWER CO., INC., Sapporo (JP)

(72) Inventor: Kazuo Harada, Hokkaido (JP)

(73) Assignee: HOKKAIDO ELECTRIC POWER CO., INC., Sapporo (JP)

( * ) Notice: Subject to any disclaimer, the term of this patent is extended or adjusted under 35 U.S.C. 154(b) by 64 days.

(21) Appl. No.: 17/436,313

(22) PCT Filed: Apr. 24, 2019

(86) PCT No.: PCT/JP2019/017449
§ 371 (c)(1),
(2) Date: Sep. 3, 2021

(87) PCT Pub. No.: WO2020/179090
PCT Pub. Date: Sep. 10, 2020

(65) Prior Publication Data
US 2022/0240526 A1    Aug. 4, 2022

(30) Foreign Application Priority Data

Mar. 7, 2019  (JP) .................................. 2019-041843

(51) Int. Cl.
*A23B 7/015*   (2006.01)
*A01F 25/00*   (2006.01)
*A23L 3/26*    (2006.01)

(52) U.S. Cl.
CPC .............. *A23B 7/015* (2013.01); *A01F 25/00* (2013.01); *A23L 3/266* (2013.01)

(58) Field of Classification Search
CPC .......... A23B 7/015; A01F 25/00; A23L 3/266
See application file for complete search history.

(56) References Cited

U.S. PATENT DOCUMENTS 3,578,464 A * 5/1971 Mpelkas .................. A23B 7/01
426/419
4,123,558 A * 10/1978 Poapst ................... A23B 7/154
426/321

(Continued)

FOREIGN PATENT DOCUMENTS

| JP | S5354555 A | 5/1978 |
| JP | 2010187598 A | 9/2010 |
| JP | 2013034399 A | 2/2013 |

(Continued)

OTHER PUBLICATIONS

Translation of JP 2016026484A (Year: 2016).*
Potato NPL, "Keep the Green Out of the Potato", https://www.groworganic.com/blogs/articles/keep-the-green-out-of-the-potato (Year: 2017).*

(Continued)

*Primary Examiner* — Drew E Becker
(74) *Attorney, Agent, or Firm* — Dorsey & Whitney LLP

(57) ABSTRACT

[Problem] To provide a method for suppressing greening of potatoes after harvest. [Solution] A method that comprises: a first step for simultaneously irradiating far-red light and light in a wavelength range other than the far-red light range to post-harvest potatoes; and a second step which involves one time period wherein the far-red light alone is irradiated to the potatoes and another time period wherein neither the far-red light nor the light in a wavelength range other than the far-red light range is irradiated thereto.

10 Claims, 10 Drawing Sheets

(56) References Cited

U.S. PATENT DOCUMENTS

| | | | |
|---|---|---|---|
| 5,884,775 A * | 3/1999 | Campbell | B07C 5/3422 |
| | | | 250/341.8 |
| 6,030,653 A * | 2/2000 | Rosenthal | A23B 4/015 |
| | | | 426/248 |
| 2010/0233331 A1* | 9/2010 | Bello | A23B 7/154 |
| | | | 426/281 |
| 2012/0100038 A1* | 4/2012 | Vasilenko | A23B 4/015 |
| | | | 250/492.1 |
| 2017/0055538 A1* | 3/2017 | Ohta | H05B 45/20 |
| 2017/0135359 A1* | 5/2017 | Nicole | A23L 3/26 |
| 2018/0054974 A1* | 3/2018 | Vasilenko | H05B 47/16 |
| 2018/0084807 A1* | 3/2018 | Aoki | H05B 47/11 |
| 2018/0310578 A1 | 11/2018 | Nicole et al. | |

FOREIGN PATENT DOCUMENTS

| | | |
|---|---|---|
| JP | 2013090626 A | 5/2013 |
| JP | 2018046796 A | 3/2018 |

OTHER PUBLICATIONS

Translation of DE 202014004033U1 (Year: 2014).*
Translation of JP 2010187598A (Year: 2010).*
Translation of JP 2013090626A (Year: 2013).*
Translation of JP 6289569B1 (Year: 2018).*
Translation of WO 2013/031925A1 (Year: 2013).*
Translation of WO 2019/176820A1 (Year: 2019).*
International Search Report and Written Opinion for International Patent Application No. PCT/JP2019/017449 dated Jul. 16, 2019, 12 pages.

* cited by examiner

Fig.1

| | | 2 | 4 | 6 | 8 | 10 | 12 | 14 | 16 | 18 | 20 | 22 | 24 |
|---|---|---|---|---|---|---|---|---|---|---|---|---|---|
| | | | | | | irradiation time (hours) | | | | | | | |
| test zone -1 | red light | ■ | ■ | ■ | ■ | ■ | ■ | | | | | | |
| test zone -2 | red light | ■ | ■ | ■ | ■ | ■ | ■ | | | | | | |
| | far-red light | ▨ | ▨ | ▨ | ▨ | ▨ | ▨ | ▨ | ▨ | ▨ | ▨ | ▨ | ▨ |
| test zone -3 | red light | ■ | ■ | ■ | ■ | ■ | ■ | | | | | | |
| | far-red light | | | | | | | | ▨ | ▨ | ▨ | ▨ | ▨ |
| test zone -4 | red light | ■ | ■ | ■ | ■ | ■ | ■ | ■ | | | | | |
| | far-red light | ▨ | ▨ | ▨ | ▨ | ▨ | ▨ | ▨ | ▨ | ▨ | ▨ | ▨ | ▨ |

Fig.3

| | | 2 | 4 | 6 | 8 | 10 | 12 | 14 | 16 | 18 | 20 | 22 | 24 |
|---|---|---|---|---|---|---|---|---|---|---|---|---|---|
| test zone -1 | red light | ■ | ■ | ■ | ■ | ■ | ■ | | | | | | |
| test zone -2 | red light | ■ | ■ | ■ | ■ | ■ | ■ | | | | | | |
| | far-red light | | | | | | | | | | | | ▨ |
| test zone -3 | red light | ■ | ■ | ■ | ■ | ■ | ■ | | | | | | |
| | far-red light | | | | | | | | | ▨ | | | |
| test zone -4 | red light | ■ | ■ | ■ | ■ | ■ | ■ | | | | | | |
| | far-red light | | | | | | | | | | | | ▨ | irradiation time (hours)

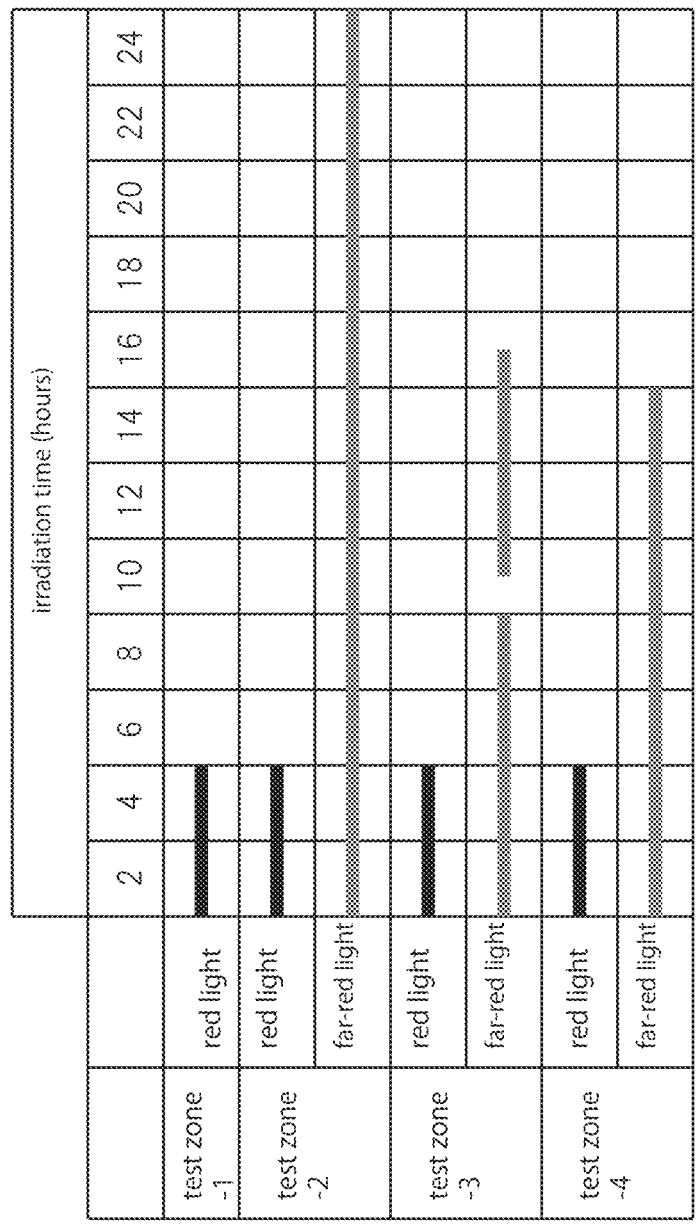

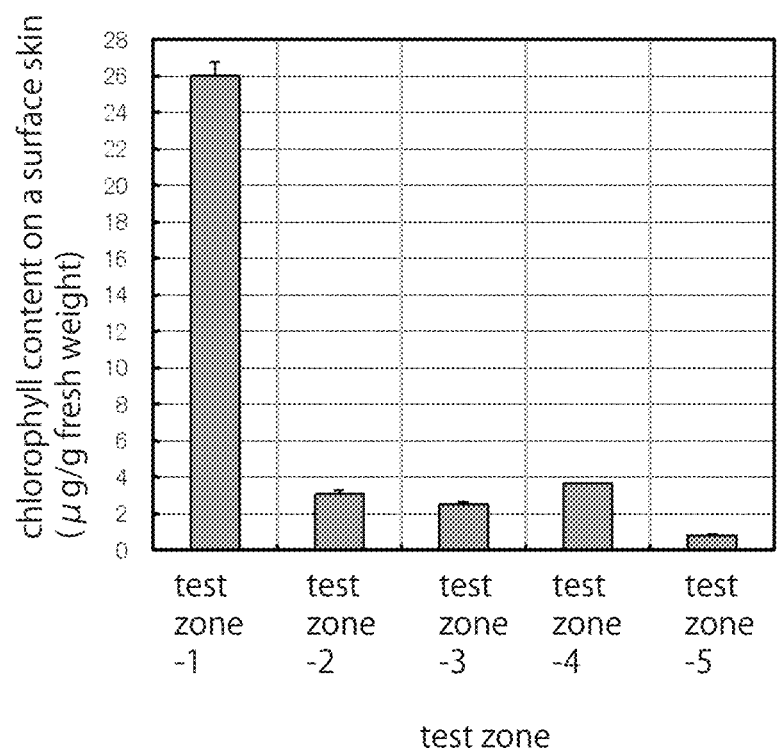

METHOD FOR SUPPRESSING GREENING

CROSS-REFERENCE TO RELATED APPLICATIONS

This application is the national stage application of International Patent Application No. PCT/JP2019/017449 filed on Apr. 24, 2019 and entitled "Method For Suppressing Greening", which claims priority to Japanese Patent Application No. 2019-041843 filed on Mar. 7, 2019 and entitled "Method For Suppressing Greening" the entire contents of which are hereby incorporated by reference herein in their entireties.

TECHNICAL FIELD

The present invention relates to a method for suppressing greening of potato tuber, for example, a method for suppressing greening used for a storage of the potato tuber after harvest.

BACKGROUND ART

It has been reported that, in the case where the potato tuber after harvest is exposed to white light such as fluorescent light, although there is a difference between the varieties, all of the varieties showed a remarkable increase of glycoalkaloid, which is a poisonous component existing in a potato tuber, along with the greening of the peripheral portion. In this case, the glycoalkaloid containing α-solanine and α-chaconine as main components may exceed 200 mg/kg fresh weight, which is a standard value for edible limit. Also, it has been reported that there is a high positive correlation between the degree of greening and the content of glycoalkaloid, and that the greening progresses as the duration of light exposure is extended and as a result, the poisonous component increases (for example, see Non-Patent Documents 1-8).

Therefore, the potato tuber after harvest is in general stored in a dark low-temperature storage. Here, a shipping operation is performed in a dark environment without turning on the indoor light as much as possible but instead turning on the light of a heavy machine such as a forklift and so on. On the other hand, in a shop, the potato of the variety that easily sprouts is often displayed in a low-temperature showcase along with other vegetables and so on that do not last long. Also, other potato that is not stored in the showcase is exposed to the lighting of the shop for a long period of time. Therefore, some shops use a light-shielding package for sale through which inside cannot be seen.

The inventors of the present application have confirmed that the greening is induced when blue light, green light, yellow light, red light, and white light containing the above lights are irradiated onto root vegetables such as potato tuber after harvest, in particular the greening is remarkably induced when red light is irradiated (for example, see Patent Document 1). Meanwhile, Patent Document 1 discloses that the greening is suppressed when far-red light is independently irradiated.

Also, the inventors of the present application have confirmed that, even under the environment in which the potato tuber and the like after harvest is exposed to the light other than far-red light for a long period of time, the greening can be suppressed by irradiating the far-red light simultaneously (for example, see Patent Document 2). Therefore, according to the method for suppressing greening disclosed in Patent Document 2, a shipping operation of the potato tuber after harvest can be performed under the light such as fluorescent light by irradiating the far-red light simultaneously, which improves operation efficiency. Also, increase of poisonous component during display in a shop can be suppressed.

Further, the inventors of the present application have confirmed that the progress of the greening of the potato tuber that has been exposed to white light and so on can be suppressed by irradiating the far-red light for a time period in which the white light and so as is not irradiated (for example, see Patent Document 3).

PRIOR ART DOCUMENTS

Patent Documents

Patent Document 1: Japanese Unexamined Patent Application Publication No. 2010-187598
Patent Document 2: Japanese Unexamined Patent Application Publication No. 2013-090626
Patent Document 3: Japanese Unexamined Patent Application Publication No. 2018-046796

Non-Patent Documents

Non-patent Document 1: Hisano, K., Miura, H., and Sugii, M. Studies on Solanine in Potato tuber Plants Harvested in Nagasaki Prefecture (I): Varietal Difference of Solanine Content in Tuber and Its Change by Light. The Japanese journal of pharmacognosy, 34, 110-116 (1980)
Non-patent Document 2: Chuda, Y. Change of Glycoalkaloid in Potato tuber depending on Storage and Distribution Condition. Journal of agricultural science, 60, 213-215 (2005)
Non-patent Document 3: Salunke, K. and Salunkhe, D. K. Chlorophyll and solanine in potato tubers: formation and control. Int. Congress Food Sci. Technol., III, 284-292 (1974)
Non-patent Document 4: Machado, R. M. D., Toledo, M. C. F., and Garcia, L. C. Effect of light and temperature on the formation of glycoalkaloids in potato tubers. Food Control, 18, 503-508 (2007)
Non-patent Document 5: Percival, G. C. The influence of light upon glycoalkaloid and chlorophyll accumulation in potato tubers t (*Solanum tuberosum* L.). Plant Sci., 145, 99-107 (1999)
Non-patent Document 6: Percival, G., Dixon, G. R. and Sword, A. Glycoalkaloid Concentration of Potato Tubers Following Exposure to Daylight. J. Sci. Food Agric., 71, 59-63 (1996)
Non-patent Document 7: Percival, G. and Dixon, G. Glycoalkaloid Concentration of Potato Tubesr Following Continuous Illumination. J. Sci. Food Agric., 66, 139-144 (1994)
Non-patent Document 8: Morris, S. C. and Lee, T. H. The toxicity and teratogenicity of Solanaceaeglycoalkaloids, particularly those of the potato (*Solanum tuberosum*): a review. Food Technol. Aust., 36, 118-124 (1984)

SUMMARY OF THE INVENTION

Problem to be Solved by the Invention

As already described, the greening of potato tuber progresses due to an exposure to white light and so on (that is, the light of a wavelength region other than far-red light). In this regard, the inventors have studied and confirmed that the potato tuber that has been exposed to white light and so on still showed progress in greening even after returning to the non-irradiation state of white light and so on.

An objective of the present invention is to provide a method for suppressing greening of the potato tuber after harvest, the method being different from Patent Documents 1-3.

Means of Solving the Problem

In order to achieve the above objective, a method for suppressing greening of the present invention includes: a first process in which far-red light and light of a wavelength region other than the far-red light are simultaneously irradiated on a potato tuber after harvest; and a second process having a time period in which the far-red light is independently irradiated to the potato tuber and a time period in which the far-red light and the light of the wavelength region other than the far-red light are not irradiated.

Effect of the Invention

In the method for suppressing greening of the present invention, the progress of the greening can be remarkably suppressed by providing, in a time period in which the light of a wavelength region other than the far-red light are not irradiated, a time period in which the far-red light is independently irradiated and a time period in which darkness is made (that is, the far-red light and the light of a wavelength region other than the far-red light are not irradiated).

BRIEF DESCRIPTION OF THE DRAWINGS

FIG. 1 shows an irradiation condition in Embodiment 1.
FIG. 3 shows an irradiation condition in Embodiment 2.
FIG. 9 shows an irradiation condition in Embodiment 5.
FIG. 10 shows a chlorophyll content in each test plot in Embodiment 5.

SUMMARY OF THE INVENTION

Figure 2:
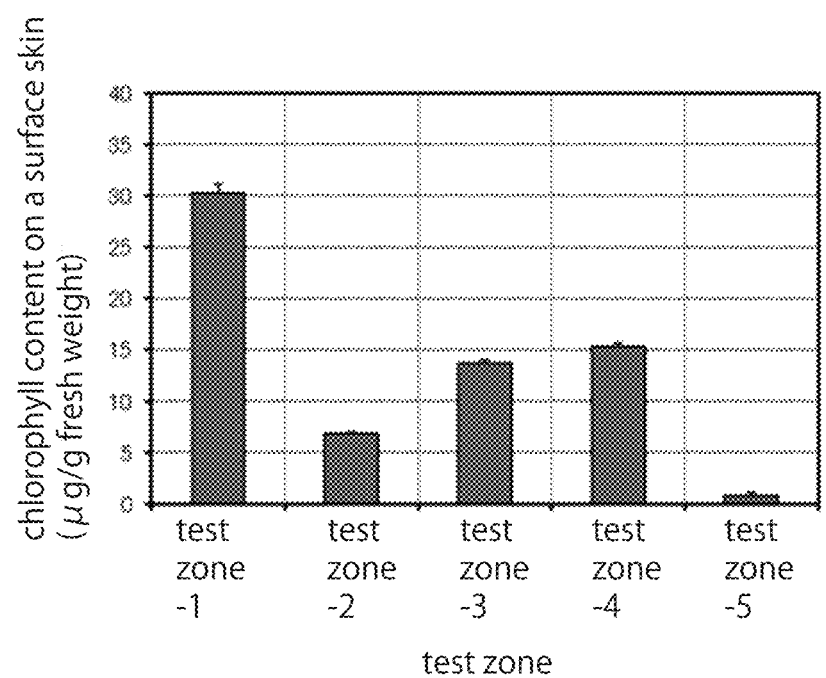
FIG. 2 shows a chlorophyll content in each test plot in Embodiment 1.

Hereinafter, embodiments of the present invention will be described. However, the numerical conditions and so on are merely preferred examples. Therefore, the present invention is not limited to the following embodiments, and many modifications that can achieve the effect of the present invention can be made without departing from the scope of the configuration of the present invention.

A method for suppressing greening according to an embodiment of the present invention includes: a first process in which far-red light and light of a wavelength region other than the far-red light are simultaneously irradiated on a potato tuber after harvest; and a second process in which the far-red light is independently irradiated to the potato tuber. The second process includes a time period in which the far-red light is not irradiated. Specifically, the second process includes a time period in which the far-red light is independently irradiated to the potato tuber and a time period in which the far-red light and the light of the wavelength region other than the far-red light are not irradiated (make darkness). Here, the far-red light has a peak wavelength of about 760 nm, and is the light included in a wavelength region of about 700-800 nm. On the other hand, the light of a wavelength region other than the far-red light is blue light, green light, yellow light, or red light, or white light containing the above lights.

When a potato tuber is exposed to white light and so on by a fluorescent light (that is, the light of a wavelength region other than the far-red light) in a storage or display in a shop, greening starts immediately. At this point, the greening is suppressed if far-red light is simultaneously irradiated. Also, in a time period in which the potato tuber is not exposed to the white light and so on, such as the time period in which the potato tuber is temporarily stored in a dark place such as a time period in which the white light and so on is turned off during storage or the potato tuber is on a display after a shop is closed, the greening is suppressed by independently irradiating the far-red light for an extended time period. When a time period in which a darkness is made without irradiating the far-red light is provided during the time period in which the far-red light is independently irradiated, the progress of the greening is also suppressed. Further, by appropriately setting the length of the time period of darkness and a time position of the dark place, the greening can be remarkably suppressed compared to the case where the time period of darkness is not provided.

Therefore, a shipping operation of potato tuber after harvest can be performed under the light such as a fluorescent light by irradiating the far-red light, which improves an operation efficiency. Also, the increase of poisonous component due to the greening can be suppressed. Further, even after turning off the white light and so on, the progress of the greening in a time period in which the white light and so on is not irradiated can be suppressed by providing a time period of darkness and irradiating the far-red light.

Further, in the above second process, it is advantageous to provide a time period of darkness to shorten the irradiation time of the far-red light in terms of energy-saving and long-life of a light source.

Embodiment 1

Embodiment 1 is a test for testing an effect for suppressing greening of potato tuber by simultaneous irradiation and extended irradiation of the far-red light with respect to the irradiation of the light of a wavelength region other than the far-red light. Note that, in Embodiment 1, red light was used as the light of a wavelength region other than the far-red light. As described above, the red light is a light of a wavelength which shows a remarkable induction of the greening of potato tuber (see Patent Document 1).

Test plots—1 to 5 are set, in which a cardboard container (hereinafter simply referred to as a container) of 34 cm, 25 cm, and 21 cm in length, width, and height, respectively, was provided in each of the test plots. An opening was formed on an upper face of each container, a glass panel was placed on the upper face of the container so as to cover the opening, and a light source was provided on the glass panel. As a test sample of potato tuber, five pieces of "Nishiyutaka" are placed in each container in the test plots—1 to 5. Herein, the test was performed by obtaining the "Nishiyutaka" which have been stored for about 0.5 months after harvest in a cool and dark place from a producer. The irradiation conditions in each of the test plots—1 to 5 are shown in Table 1 and FIG. 1.

TABLE 1

| test zone | light source | light intensity (W/m²) | irradiation conditions in a day |
|---|---|---|---|
| test zone-1 | red light | 8 | 12 hours of continuous irradiation |
| test zone-2 | red light and far-red light | 8 each | red light: 12 hours of continuous irradiation<br>far-red light: 24 hours of continuous irradiation |
| test zone-3 | red light and far-red light | 8 each | red light: 12 hours of continuous irradiation<br>far-red light: 24 hours of continuous irradiation<br>->2 hours of non-irradiation<br>->10 hours of continuous irradiation |
| test zone-4 | red light and far-red light | 8 each | red light: 14 hours of continuous irradiation<br>far-red light: 12 hours of continuous irradiation<br>->2 hours of non-irradiation<br>->10 hours of continuous irradiation |
| test zone-5 | no irradiation | 0 | |

Test plot—1 is a plot where a red-light irradiation is performed. An LED was used as a light source of the red light. In an evaluation of spectral characteristics of the light source in use using a spectroradiometer (LI-1800 manufactured by LI-COR, Inc.), the red light showed a peak at about 660 nm. A light intensity of the red light was 8 W/m² on a bottom face in the vicinity of the center of the container directly below the light source.

In the test plot—1, the irradiation time in a day was 12 hours continuously, and the other 12 hours was set dark.

Test plots—2 to 4 are plots where a red-light irradiation and a far-red light irradiation are performed. LEDs are used as light source of the red light and the far-red light, respectively. In an evaluation of spectral characteristics of the light source in use using a spectroradiometer, the red light showed a peak at about 660 nm. Also, the far-red light showed a peak at about 760 nm. A light intensity of the red light and the far-red light was 8 W/m² each (16 W/m² in total) on a bottom face in the vicinity of the center of the container directly below the light source.

In the test plot—2, a simultaneous irradiation time of the red light and the far-red light in a day was 12 hours continuously, and an independent irradiation of the far-red light was performed for the other 12 hours. That is, for the red light, an intermittent irradiation was performed in which 12 hours of continuous irradiation and 12 hours of non-irradiation are repeated. Also, 24 hours of continuous irradiation was performed for the far-red light.

In the test plot—3, a simultaneous irradiation time of the red light and the far-red light in a day was 12 hours continuously, 2 hours of time period of darkness was set, and then an independent irradiation of the far-red light was performed for the remaining 10 hours. That is, for the red light, an intermittent irradiation was performed in which 12 hours of continuous irradiation and 12 hours of non-irradiation are repeated. Also, a continuous irradiation was performed for the far-red light except the above time period of darkness.

In the test plot—4, a simultaneous irradiation time of the red light and the far-red light in a day was 12 hours continuously, 2 hours of time period of an independent irradiation of the red light was set, and then an independent irradiation of the far-red light was performed for the remaining 10 hours. That is, for the red light, an intermittent irradiation was performed in which 14 hours of continuous irradiation and 10 hours of non-irradiation are repeated. Also, a continuous irradiation was performed for the far-red light except the above time period of an independent irradiation of the red light.

The test plot—5 is a plot where no irradiation was performed, and thus was made dark.

In all the test plots—1 to 5, the test period was set 18 days. Also, in the test plots—1 to 5 during the test period, the temperature transits in a range of about 17.5 to 19° C., and the humidity transits in a range of about 55 to 65%, with no difference between each of the test plots.

Then, the test samples in each of the test plots after completion of the test period (18 days) were subjected to a measurement of the chlorophyll content in a peripheral zone as an indicator of the greening. The peripheral portion was collected from five test samples from each of the test plots, and the collected portion was then freeze-dried and powderized. Here, the peripheral portion refers to more or less 1 mm in thickness of a peripheral zone of a light irradiation region. Note that, in a visual inspection, all of the five samples from each of the test plots showed a uniform condition such as presence/absence of the greening, and no difference was found depending on the placed position.

Chlorophyll was extracted from the freeze-dried powder samples in methanol. An absorption spectrum was measured using an aliquot of supernatant, and the chlorophyll content was calculated. Here, the measurement of the absorption spectrum was performed using a spectrophotometer (U-3000, Hitachi, Ltd.), and the chlorophyll content was calculated based on the measurement result by a relational formula of Holden (see Holden, M., Chemistry and Biochemistry of Plant Pigments, Goodwin, T. W., pp. 1-37 (1976)). The calculated chlorophyll content is shown in FIG. 2.

In the test plot—1 in which only red light was irradiated, the chlorophyll content was about 30.3 μg/g fresh weight. On the other hand, the chlorophyll contents in all of the test plots—2 to 4 in which the red light and the far-red light were irradiated have decreased compared to that in the test plot—1: the test plot—2 was about 6.9 μg/g fresh weight; the test plot—3 was about 13.7 μg/g fresh weight, and the test plot—4 was about 15.4 μg/g fresh weight.

From the above results, it was confirmed that, even under the irradiation of the red light, the greening of potato tuber can be suppressed by performing a simultaneous irradiation of the far-red light and then irradiating the far-red light during a time period in which the red light was not irradiated.

In the test plot—3 in which a time period of darkness was set immediately after the simultaneous irradiation of the red light and the far-red light and then an independent irradiation of the far-red light was performed, the greening suppressing effect was degraded compared to the test plot—2 in which the time period of darkness was not provided after the simultaneous irradiation of the red light and the far-red light. However, as described above, it was confirmed that the greening of potato tuber was also suppressed in the test plot—3 compared to the test plot—1 in which only the red light was irradiated and the far-red light was not irradiated.

Note that no difference was found in the water content and the Brix sugar content of the test sample depending on the test plots.

Embodiment 2

Embodiment 2 is a test for testing an effect for suppressing greening of potato tuber by simultaneous irradiation and extended irradiation of the far-red light with respect to the irradiation of the light of a wavelength region other than the far-red light.

Test plots—1 to 4 are set, in which a cardboard container (hereinafter also simply referred to as a container) of 34 cm, 25 cm, and 21 cm in length, width, and height, respectively, was provided in each of the test plots. An opening was formed on an upper face of each container, a glass panel was placed on the upper face of the container so as to cover the opening, and a light source was provided on the glass panel. As a test sample of potato tuber, five pieces of "Nishiyutaka" are placed in each container in the test plots—1 to 4. Herein, the test was performed by obtaining the "Nishiyutaka" which have been stored for about 1.2 months after harvest in a cool and dark place from a producer. The irradiation conditions in each of the test plots—1 to 4 are shown in Table 2 and FIG. 3.

continuously, and an independent irradiation of the far-red light was performed for the other 12 hours. That is, for the red light, an intermittent irradiation was performed in which 12 hours of continuous irradiation and 12 hours of non-irradiation are repeated. Also, 24 hours of continuous irradiation was performed for the far-red light.

In the test plot—3, a simultaneous irradiation time of the red light and the far-red light in a day was 12 hours continuously, an independent irradiation of the far-red light was performed for 4 hours, 1 hour of time period of darkness was set, and then an independent irradiation of the far-red light was performed for the remaining 7 hours. That is, for the red light, an intermittent irradiation was performed in which 12 hours of continuous irradiation and 12 hours of non-irradiation are repeated. Also, a continuous irradiation was performed for the far-red light except the above time period of darkness.

In the test plot—4, a simultaneous irradiation time of the red light and the far-red light in a day was 12 hours continuously, an independent irradiation of the far-red light was performed for 4 hours, 30 minutes of time period of darkness was set, and then an independent irradiation of the far-red light was performed for the remaining 7.5 hours. That is, for the red light, an intermittent irradiation was performed in which 12 hours of continuous irradiation and 12 hours of non-irradiation are repeated. Also, a continuous irradiation was performed for the far-red light except the above time period of darkness.

In all the test plots—1 to 4, the test period was set 18 days. Also, in the test plots—1 to 4 during the test period, the

TABLE 2

| test zone | light source | light intensity (W/m$^2$) | irradiation conditions in a day |
| --- | --- | --- | --- |
| test zone-1 | red light | 8 | 12 hours of continuous irradiation |
| test zone-2 | red light and far-red light | 8 each | red light: 12 hours of continuous irradiation<br>far-red light: 24 hours of continuous irradiation |
| test zone-3 | red light and far-red light | 8 each | red light: 12 hours of continuous irradiation<br>far-red light: 16 hours of continuous irradiation<br>->1 hours of non-irradiation<br>->7 hours of continuous irradiation |
| test zone-4 | red light and far-red light | 8 each | red light: 12 hours of continuous irradiation<br>far-red light: 16 hours of continuous irradiation<br>->0.5 hours of non-irradiation<br>->7.5 hours of continuous irradiation |

Test plot—1 is a plot where a red-light irradiation was performed. An LED was used as a light source of the red light. In an evaluation of spectral characteristics of the light source in use using a spectroradiometer, the red light showed a peak at about 660 nm. A light intensity of the red light was 8 W/m$^2$ on a bottom face in the vicinity of the center of the container directly below the light source.

In the test plot—1, the irradiation time in a day was 12 hours continuously, and the other 12 hours was set dark.

Test plots—2 to 4 are plots where a red-light irradiation and a far-red light irradiation are performed. LEDs are used as light source of the red light and the far-red light, respectively. In an evaluation of spectral characteristics of the light source in use using a spectroradiometer, the red light showed a peak at about 660 nm. Also, the far-red light showed a peak at about 760 nm. A light intensity of the red light and the far-red light was 8 W/m$^2$ each (16 W/m$^2$ in total) on a bottom face in the vicinity of the center of the container directly below the light source.

In the test plot—2, a simultaneous irradiation time of the red light and the far-red light in a day was 12 hours temperature transits in a range of about 17.5 to 19.5° C., and the humidity transits in a range of about 55 to 65%, with no difference between each of the test plots.

Figure 4:
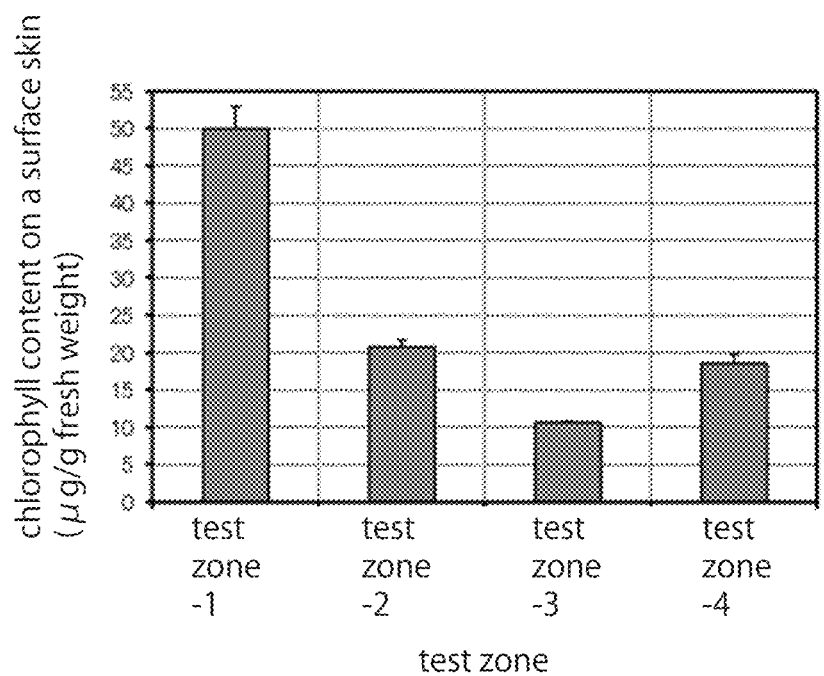
FIG. 4 shows a chlorophyll content in each test plot in Embodiment 2.

Then, the test samples in each of the test plots after completion of the test period (18 days) were subjected to a measurement of the chlorophyll content in a peripheral zone as an indicator of the greening. The peripheral portion was collected from five test samples from each of the test plots, and the collected portion was then freeze-dried and powderized. Here, the peripheral portion refers to more or less 1 mm in thickness of a peripheral zone of a light irradiation region. Chlorophyll was extracted from the freeze-dried powder samples in methanol. An absorption spectrum was measured using an aliquot of supernatant, and the chlorophyll content was calculated. The calculated chlorophyll content is shown in FIG. 4. Note that, in a visual inspection, all of the five samples from each of the test plots showed a uniform condition such as presence/absence of the greening, and no difference was found depending on the placed position.

In the test plot—1 in which only red light was irradiated, the chlorophyll content was about 49.9 µg/g fresh weight. On the other hand, the chlorophyll contents in all of the test plots—2 to 4 in which the red light and the far-red light were irradiated have decreased compared to that in the test plot—1: the test plot—2 was about 20.7 µg/g fresh weight; the test plot—3 was about 10.6 µg/g fresh weight, and the test plot—4 was about 18.5 µg/g fresh weight.

From the above results, it was confirmed that, even under the irradiation of the red light, the greening of potato tuber can be suppressed by performing a simultaneous irradiation of the far-red light and then irradiating the far-red light during a time period in which the red light was not irradiated.

Further, in the test plots—3 and 4 in which a time period of darkness was set in the middle of the time period in which the far-red light was independently irradiated, it was confirmed that the greening suppressing effect was improved compared to the test plot—2 in which a time period of darkness was not set. In particular, in the test plot—3 in which a time period of 1 hour of darkness was set after 4 hours of independent irradiation of the far-red light, it was confirmed that the greening of potato tuber was remarkably suppressed.

Note that no difference was found in the water content and the Brix sugar content of the test sample depending on the test plots.

Embodiment 3

Embodiment 3 is a test for testing an effect for suppressing greening of potato tuber by simultaneous irradiation and extended irradiation of the far-red light with respect to the irradiation of the light of a wavelength region other than the far-red light.

Figure 5:
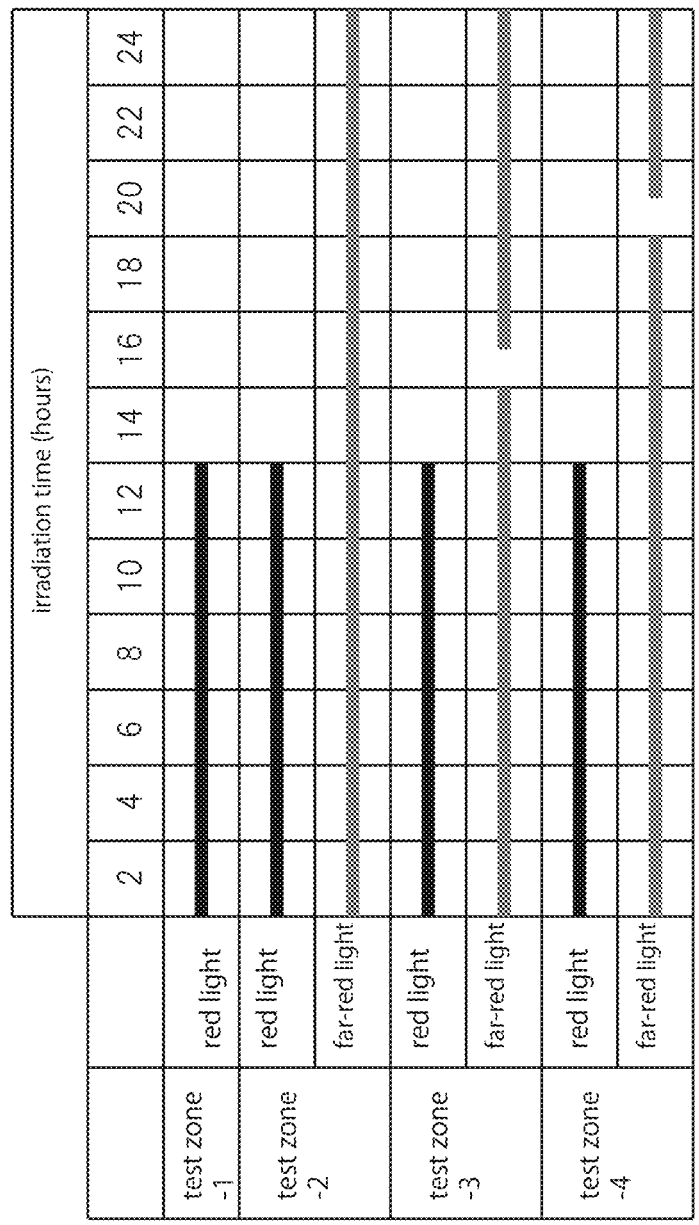
FIG. 5 shows an irradiation condition in Embodiment 3.

Test plots—1 to 4 are set, in which a cardboard container (hereinafter also simply referred to as a container) of 34 cm, 25 cm, and 21 cm in length, width, and height, respectively, was provided in each of the test plots. An opening was formed on an upper face of each container, a glass panel was placed on the upper face of the container so as to cover the opening, and a light source was provided on the glass panel. As a test sample of potato tuber, five pieces of "Nishiyutaka" are placed in each container in the test plots—1 to 4. Herein, the test was performed by obtaining the "Nishiyutaka" which have been stored for about 1.9 months after harvest in a cool and dark place from a producer. The irradiation conditions in each of the test plots—1 to 4 are shown in Table 3 and FIG. 5.

Test plot—1 is a plot where a red-light irradiation was performed. An LED was used as a light source of the red light. In an evaluation of spectral characteristics of the light source in use using a spectroradiometer, the red light showed a peak at about 660 nm. A light intensity of the red light was 8 W/m$^2$ on a bottom face in the vicinity of the center of the container directly below the light source.

In the test plot—1, the irradiation time in a day was 12 hours continuously, and the other 12 hours was set dark.

Test plots—2 to 4 are plots where a red-light irradiation and a far-red light irradiation are performed. LEDs are used as light source of the red light and the far-red light, respectively. In an evaluation of spectral characteristics of the light source in use using a spectroradiometer, the red light showed a peak at about 660 nm. Also, the far-red light showed a peak at about 760 nm. A light intensity of the red light and the far-red light was 8 W/m$^2$ each (16 W/m$^2$ in total) on a bottom face in the vicinity of the center of the container directly below the light source.

In the test plot—2, a simultaneous irradiation time of the red light and the far-red light in a day was 12 hours continuously, and an independent irradiation of the far-red light was performed for the other 12 hours. That is, for the red light, an intermittent irradiation was performed in which 12 hours of continuous irradiation and 12 hours of non-irradiation are repeated. Also, 24 hours of continuous irradiation was performed for the far-red light.

In the test plot—3, a simultaneous irradiation time of the red light and the far-red light in a day was 12 hours continuously, an independent irradiation of the far-red light was performed for 2 hours, 1 hour of time period of darkness was set, and then an independent irradiation of the far-red light was performed for the remaining 9 hours. That is, for the red light, an intermittent irradiation was performed in which 12 hours of continuous irradiation and 12 hours of non-irradiation are repeated. Also, a continuous irradiation was performed for the far-red light except the above time period of darkness.

In the test plot—4, a simultaneous irradiation time of the red light and the far-red light in a day was 12 hours continuously, an independent irradiation of the far-red light was performed for 6 hours, 1 hour of time period of darkness was set, and then an independent irradiation of the far-red light was performed for the remaining 5 hours. That is, for the red light, an intermittent irradiation was performed in which 12 hours of continuous irradiation and 12 hours of non-irradiation are repeated. Also, a continuous irradiation was performed for the far-red light except the above time period of darkness.

TABLE 3

| test zone | light source | light intensity (W/m$^2$) | irradiation conditions in a day |
|---|---|---|---|
| test zone-1 | red light | 8 | 12 hours of continuous irradiation |
| test zone-2 | red light and far-red light | 8 each | red light: 12 hours of continuous irradiation<br>far-red light: 24 hours of continuous irradiation |
| test zone-3 | red light and far-red light | 8 each | red light: 12 hours of continuous irradiation<br>far-red light: 14 hours of continuous irradiation<br>->1 hours of non-irradiation<br>->9 hours of continuous irradiation |
| test zone-4 | red light and far-red light | 8 each | red light: 12 hours of continuous irradiation<br>far-red light: 18 hours of continuous irradiation<br>->1 hours of non-irradiation<br>->5 hours of continuous irradiation |

In all the test plots—1 to 4, the test period was set 18 days. Also, in the test plots—1 to 4 during the test period, the temperature transits in a range of about 17.5 to 19° C., and the humidity transits in a range of about 50 to 65%, with no difference between each of the test plots.

Figure 6:
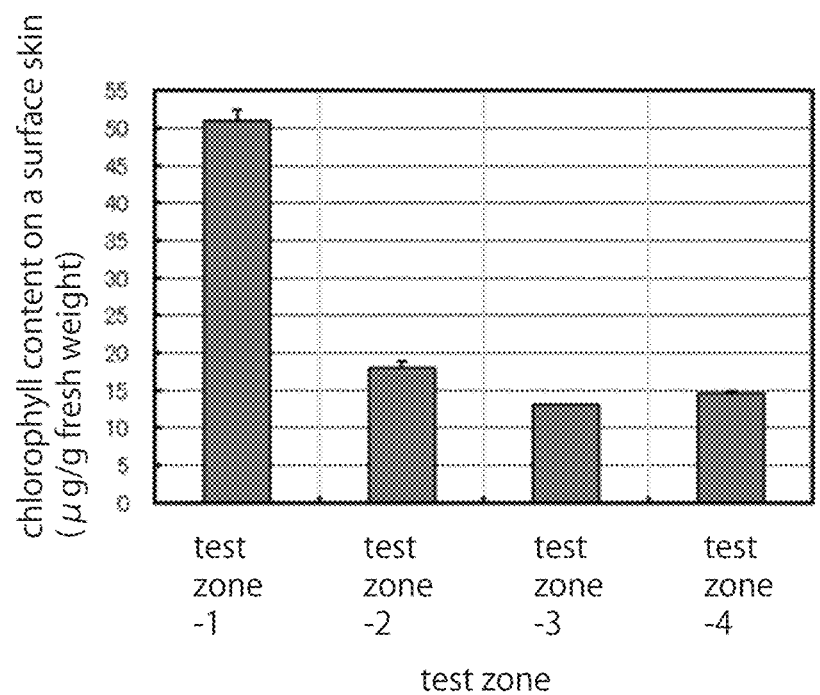
FIG. 6 shows a chlorophyll content in each test plot in Embodiment 3.

Then, the test samples in each of the test plots after completion of the test period (18 days) were subjected to a measurement of the chlorophyll content in a peripheral zone as an indicator of the greening. The peripheral portion was collected from five test samples from each of the test plots, and the collected portion was then freeze-dried and powderized. Here, the peripheral portion refers to more or less 1 mm in thickness of a peripheral zone of a light irradiation region. Chlorophyll was extracted from the freeze-dried powder samples in methanol. An absorption spectrum was measured using an aliquot of supernatant, and the chlorophyll content was calculated. The calculated chlorophyll content is shown in FIG. 6. Note that, in a visual inspection, all of the five samples from each of the test plots showed a uniform condition such as presence/absence of the greening, and no difference was found depending on the placed position.

In the test plot—1 in which only red light was irradiated, the chlorophyll content was about 51.0 µg/g fresh weight. On the other hand, the chlorophyll contents in all of the test plots—2 to 4 in which the red light and the far-red light were irradiated have decreased compared to that in the test plot—1: the test plot—2 was about 18.0 µg/g fresh weight; the test plot—3 was about 13.1 µg/g fresh weight, and the test plot—4 was about 14.6 µg/g fresh weight.

From the above results, it was confirmed that, even under the irradiation of the red light, the greening of potato tuber can be suppressed by performing a simultaneous irradiation of the far-red light and then irradiating the far-red light during a time period in which the red light was not irradiated.

Further, in the test plots—3 and 4 in which a time period of darkness was set in the middle of the time period in which the far-red light was independently irradiated, it was confirmed that the greening suppressing effect was improved compared to the test plot—2 in which a time period of darkness was not set. In particular, in the test plot—3 in which a time period of 1 hour of darkness was set after 2 hours of independent irradiation of the far-red light, it was confirmed that the greening of potato tuber was remarkably suppressed.

Note that no difference was found in the water content and the Brix sugar content of the test sample depending on the test plots.

Embodiment 4

Embodiment 4 is a test for testing an effect for suppressing greening of potato tuber by simultaneous irradiation and extended irradiation of the far-red light with respect to the irradiation of the light of a wavelength region other than the far-red light.

Figure 7:
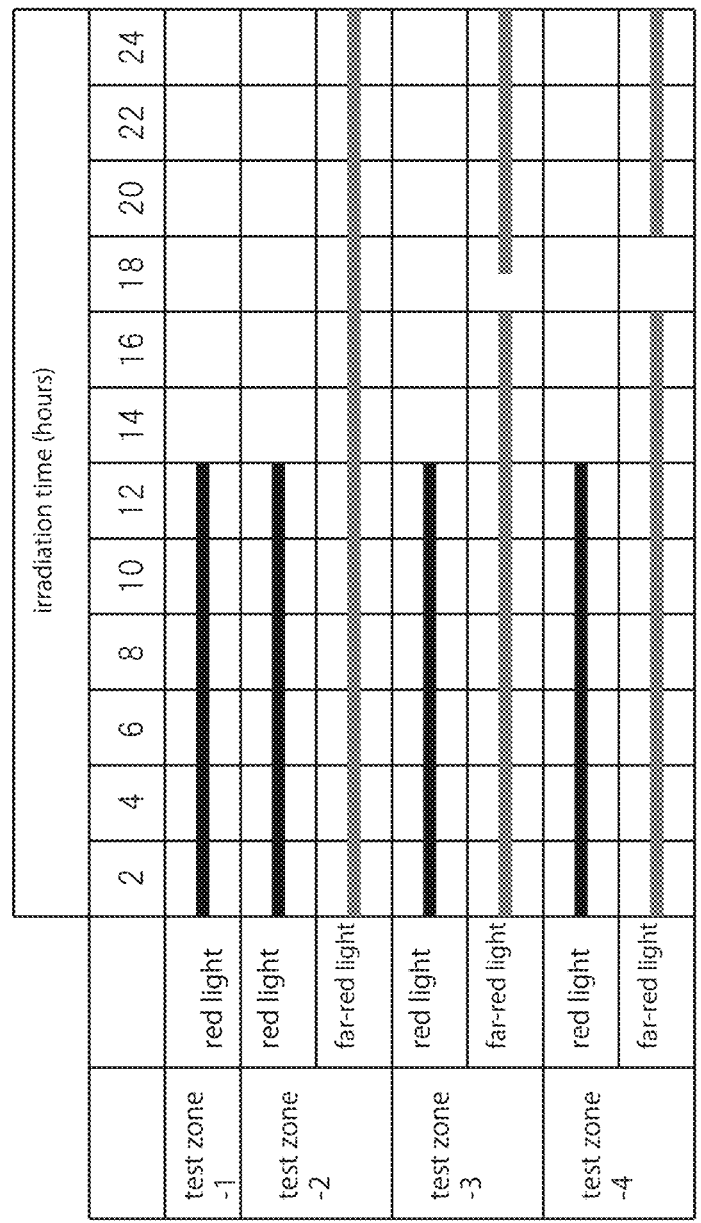
FIG. 7 shows an irradiation condition in Embodiment 4.

Test plots—1 to 5 are set, in which a cardboard container (hereinafter also simply referred to as a container) of 34 cm, 25 cm, and 21 cm in length, width, and height, respectively, was provided in each of the test plots. An opening was formed on an upper face of each container, a glass panel was placed on the upper face of the container so as to cover the opening, and a light source was provided on the glass panel. As a test sample of potato tuber, five pieces of "Dansyaku" are placed in each container in the test plots—1 to 5. Herein, the test was performed by obtaining the "Dansyaku" which have been stored for about 1 month after harvest in a cool and dark place from a producer. The irradiation conditions in each of the test plots—1 to 5 are shown in Table 4 and FIG. 7.

TABLE 4

| test zone | light source | light intensity (W/m$^2$) | irradiation conditions in a day |
|---|---|---|---|
| test zone-1 | red light | 8 | 12 hours of continuous irradiation |
| test zone-2 | red light and far-red light | 8 each | red light: 12 hours of continuous irradiation<br>far-red light: 24 hours of continuous irradiation |
| test zone-3 | red light and far-red light | 8 each | red light: 12 hours of continuous irradiation<br>far-red light: 16 hours of continuous irradiation<br>->1 hours of non-irradiation<br>->7 hours of continuous irradiation |
| test zone-4 | red light and far-red light | 8 each | red light: 12 hours of continuous irradiation<br>far-red light: 16 hours of continuous irradiation<br>->2 hours of non-irradiation<br>->6 hours of continuous irradiation |
| test zone-5 | no irradiation | 0 | |

Test plot—1 is a plot where a red-light irradiation was performed. An LED was used as a light source of the red light. In an evaluation of spectral characteristics of the light source in use using a spectroradiometer, the red light showed a peak at about 660 nm. A light intensity of the red light was 8 W/m$^2$ on a bottom face in the vicinity of the center of the container directly below the light source.

In the test plot—1, the irradiation time in a day was 12 hours continuously, and the other 12 hours was set dark.

Test plots—2 to 4 are plots where a red-light irradiation and a far-red light irradiation are performed. LEDs are used as light source of the red light and the far-red light, respectively. In an evaluation of spectral characteristics of the light source in use using a spectroradiometer, the red light showed a peak at about 660 nm. Also, the far-red light showed a peak at about 760 nm. A light intensity of the red light and the far-red light was 8 W/m$^2$ each (16 W/m$^2$ in total) on a bottom face in the vicinity of the center of the container directly below the light source.

In the test plot—2, a simultaneous irradiation time of the red light and the far-red light in a day was 12 hours continuously, and an independent irradiation of the far-red light was performed for the other 12 hours. That is, for the red light, an intermittent irradiation was performed in which 12 hours of continuous irradiation and 12 hours of non-irradiation are repeated. Also, 24 hours of continuous irradiation was performed for the far-red light.

In the test plot—3, a simultaneous irradiation time of the red light and the far-red light in a day was 12 hours continuously, an independent irradiation of the far-red light was performed for 4 hours, 1 hour of time period of darkness was set, and then an independent irradiation of the far-red light was performed for the remaining 7 hours. That is, for the red light, an intermittent irradiation was performed in which 12 hours of continuous irradiation and 12 hours of non-irradiation are repeated. Also, a continuous irradiation was performed for the far-red light except the above time period of darkness.

In the test plot—4, a simultaneous irradiation time of the red light and the far-red light in a day was 12 hours continuously, an independent irradiation of the far-red light was performed for 4 hours, 2 hours of time period of darkness was set, and then an independent irradiation of the far-red light was performed for the remaining 6 hours. That is, for the red light, an intermittent irradiation was performed in which 12 hours of continuous irradiation and 12 hours of non-irradiation are repeated. Also, a continuous irradiation was performed for the far-red light except the above time period of darkness.

The test plot—5 is a plot where no irradiation was performed, and thus was made dark.

In all the test plots—1 to 5, the test period was set 25 days. Also, in the test plots—1 to 5 during the test period, the temperature transits in a range of about 17.5 to 19.5° C., and the humidity transits in a range of about 50 to 65%, with no difference between each of the test plots.

Figure 8:
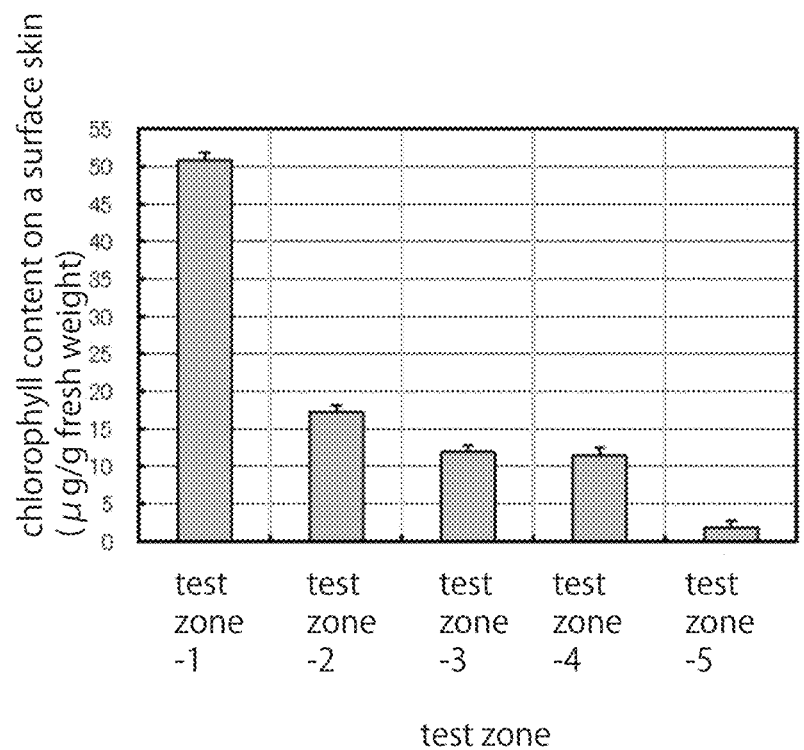
FIG. 8 shows a chlorophyll content in each test plot in Embodiment 4.

Then, the test samples in each of the test plots after completion of the test period (25 days) were subjected to a measurement of the chlorophyll content in a peripheral zone as an indicator of the greening. The peripheral portion was collected from five test samples from each of the test plots, and the collected portion was then freeze-dried and powderized. Here, the peripheral portion refers to more or less 1 mm in thickness of a peripheral zone of a light irradiation region. Chlorophyll was extracted from the freeze-dried powder samples in methanol. An absorption spectrum was measured using an aliquot of supernatant, and the chlorophyll content was calculated. The calculated chlorophyll content is shown in FIG. 8. Note that, in a visual inspection, all of the five samples from each of the test plots showed a uniform condition such as presence/absence of the greening, and no difference was found depending on the placed position.

In the test plot—1 in which only red light was irradiated, the chlorophyll content was about 50.8 µg/g fresh weight. On the other hand, the chlorophyll contents in all of the test plots—2 to 4 in which the red light and the far-red light were irradiated have decreased compared to that in the test plot—1: the test plot—2 was about 17.4 µg/g fresh weight; the test plot—3 was about 11.8 µg/g fresh weight, and the test plot—4 was about 11.5 µg/g fresh weight.

From the above results, it was confirmed that, even under the irradiation of the red light, the greening of potato tuber can be suppressed by performing a simultaneous irradiation of the far-red light and then irradiating the far-red light during a time period in which the red light was not irradiated.

Further, in the test plots—3 and 4 in which a time period of darkness was set in the middle of the time period in which the far-red light was independently irradiated, it was confirmed that the greening suppressing effect was improved compared to the test plot—2 in which a time period of darkness was not set. Also, it was confirmed that substantially equal greening suppressing effect was obtained in the test plot—3 in which 1 hour of the time period of darkness was set and in the test plot—4 in which 2 hours of the time period of darkness was set.

Note that no difference was found in the water content and the Brix sugar content of the test sample depending on the test plots.

Embodiment 5

Embodiment 5 is a test for testing an effect for suppressing greening of potato tuber by simultaneous irradiation and extended irradiation of the far-red light with respect to the irradiation of the light of a wavelength region other than the far-red light.

Test plots—1 to 5 are set, in which a cardboard container (hereinafter simply referred to as a container) of 34 cm, 25 cm, and 21 cm in length, width, and height, respectively, was provided in each of the test plots. An opening was formed on an upper face of each container, a glass panel was placed on the upper face of the container so as to cover the opening, and a light source was provided on the glass panel. As a test sample of potato tuber, five pieces of "Dansyaku" are placed in each container in the test plots—1 to 5. Herein, the test was performed by obtaining the "Dansyaku" which have been stored for about 3 months after harvest in a cool and dark place from a producer. The irradiation conditions in each of the test plots—1 to 5 are shown in Table 5 and FIG. 9.

TABLE 5

| test zone | light source | light intensity (W/m$^2$) | irradiation conditions in a day |
|---|---|---|---|
| test zone-1 | red light | 8 | 4 hours of continuous irradiation |
| test zone-2 | red light and far-red light | 8 each | red light: 4 hours of continuous irradiation<br>far-red light: 24 hours of continuous irradiation |
| test zone-3 | red light and far-red light | 8 each | red light: 4 hours of continuous irradiation<br>far-red light: 8 hours of continuous irradiation<br>->1 hours of non-irradiation<br>->6 hours of continuous irradiation<br>->9 hours of non-irradiation |
| test zone-4 | red light and far-red light | 8 each | red light: 4 hours of continuous irradiation<br>far-red light: 14 hours of continuous irradiation<br>->10 hours of non-irradiation |
| test zone-5 | no irradiation | 0 | |

Test plot—1 is a plot where a red-light irradiation was performed. An LED was used as a light source of the red light. In an evaluation of spectral characteristics of the light source in use using a spectroradiometer, the red light showed a peak at about 660 nm. A light intensity of the red light was 8 W/m² on a bottom face in the vicinity of the center of the container directly below the light source.

In the test plot—1, the irradiation time in a day was 4 hours continuously, and the other 20 hours was set dark.

Test plots—2 to 4 are plots where a red-light irradiation and a far-red light irradiation are performed. LEDs are used as light source of the red light and the far-red light, respectively. In an evaluation of spectral characteristics of the light source in use using a spectroradiometer, the red light showed a peak at about 660 nm. Also, the far-red light showed a peak at about 760 nm. A light intensity of the red light and the far-red light was 8 W/m² each (16 W/m² in total) on a bottom face in the vicinity of the center of the container directly below the light source.

In the test plot—2, a simultaneous irradiation time of the red light and the far-red light in a day was 4 hours continuously, and an independent irradiation of the far-red light was performed for the other 20 hours. That is, for the red light, an intermittent irradiation was performed in which 4 hours of continuous irradiation and 20 hours of non-irradiation are repeated. Also, 24 hours of continuous irradiation was performed for the far-red light.

In the test plot—3, a simultaneous irradiation time of the red light and the far-red light in a day was 4 hours continuously, an independent irradiation of the far-red light was performed for 4 hours, 1 hour of time period of darkness was set, an independent irradiation of the far-red light was performed for 6 hours, and darkness was set for the remaining 9 hours. That is, for the red light, an intermittent irradiation was performed in which 4 hours of continuous irradiation and 20 hours of non-irradiation are repeated. Also, for the far-red light, an intermittent irradiation was performed in which irradiation and non-irradiation are performed in the above time period.

In the test plot—4, a simultaneous irradiation time of the red light and the far-red light in a day was 4 hours continuously, an independent irradiation of the far-red light was performed for 10 hours, and darkness was set for the remaining 10 hours. That is, for the red light, an intermittent irradiation was performed in which 4 hours of continuous irradiation and 20 hours of non-irradiation are repeated. Also, for the far-red light, an intermittent irradiation was performed in which 14 hours of continuous irradiation and 10 hours of non-irradiation are performed.

The test plot—5 is a plot where no irradiation was performed, and thus was made dark.

In all the test plots—1 to 5, the test period was set 78 days. Also, in the test plots—1 to 5 during the test period, the temperature transits in a range of about 17 to 19° C., and the humidity transits in a range of about 40 to 55%, with no difference between each of the test plots.

Then, the test samples in each of the test plots after completion of the test period (78 days) were subjected to a measurement of the chlorophyll content in a peripheral zone as an indicator of the greening. The peripheral portion was collected from five test samples from each of the test plots, and the collected portion was then freeze-dried and powderized. Here, the peripheral portion refers to more or less 1 mm in thickness of a peripheral zone of a light irradiation region. Chlorophyll was extracted from the freeze-dried powder samples in methanol. An absorption spectrum was measured using an aliquot of supernatant, and the chlorophyll content was calculated. The calculated chlorophyll content is shown in FIG. 10. Note that, in a visual inspection, all of the five samples from each of the test plots showed a uniform condition such as presence/absence of the greening, and no difference was found depending on the placed position.

In the test plot—1 in which only red light was irradiated, the chlorophyll content was about 26.0 μg/g fresh weight. On the other hand, the chlorophyll contents in all of the test plots—2 to 4 in which the red light and the far-red light were irradiated have decreased compared to that in the test plot—1: the test plot—2 was about 3.1 μg/g fresh weight; the test plot—3 was about 2.5 μg/g fresh weight, and the test plot—4 was about 3.6 μg/g fresh weight.

From the above results, it was confirmed that, even when the time period in which the red light and the far-red light are simultaneously irradiated was set as short as 4 hours, the greening of potato tuber can be remarkably suppressed by irradiating the far-red light also during a time period in which the red light was not irradiated.

Further, in the test plot—3 in which 1 hour of time period of darkness was set in the middle of the time period in which the far-red light was independently irradiated, it was confirmed that the greening suppressing effect was improved compared to the test plot—2 in which a time period of darkness was not set. Also, it was confirmed that the greening suppressing effect close to that of the test plot—2 in which the time period of darkness was not set was obtained also in the test plot—4 in which the far-red light was continuously irradiated for 14 hours.

Note that no difference was found in the water content and the Brix sugar content of the test sample depending on the test plots.

The invention claimed is:

1. A method for suppressing greening of a potato tuber previously exposed to white light, comprising:
    in a first time period, irradiating the potato tuber with far-red light and light of a wavelength region other than the far-red light, simultaneously;
    in a second time period that is directly subsequent to the first time period, irradiating the potato tuber with the far-red light and not irradiating the potato tuber with the light of a wavelength region other than the far-red light;
    in a third time period that is directly subsequent to the second time period, not irradiating the potato tuber with the far-red light and not irradiating the potato tuber with the light of a wavelength region other than the far-red light; and
    in a fourth time period that is directly subsequent to the third time period, irradiating the potato tuber with the far-red light and not irradiating the potato tuber with the light of a wavelength region other than the far-red light;
    wherein the first time period, the second time period, the third time period, and the fourth time period occur within a 24 hour period.

2. The method for suppressing greening according to claim 1, wherein
    a light intensity of a light source emitting the light of the wavelength region other than the far-red light is 8 W/m² directly below the light source, and
    a light intensity of a far-red light source emitting the far-red light is 8 W/m² directly below the far-red light source.

3. The method for suppressing greening according to claim 1, wherein:
    during the first time period, the far-red light and the light of the wavelength region other than the far-red light are simultaneously and continuously irradiated for a 12 hour period; and following the first period, the far-red light is irradiated for a 4 hour period continuously during the second time period;

during the second time period, the light of the wavelength region other than the far-red light is not irradiated;

following the 4 hour period and during the third time period, the far-red light and the light of the wavelength region other than the far-red light are not irradiated for a 1 hour period; and following the third time period and during the fourth time period, far-red light is irradiated continuously for a 7 hour period.

4. The method for suppressing greening according to claim 1, wherein:

during the first time period, the far-red light and the light of the wavelength region other than the far-red light are simultaneously and continuously irradiated for a 12 hour period;

during the second time period, the far-red light is continuously irradiated for a 4 hour period, following the first time period;

during the third time period, the potato tuber is not irradiated for a 0.5 hour period, following the second time period; and during the fourth time period, the potato tuber is then irradiated for a 7.5 hour period, following the third time period.

5. The method for suppressing greening according to claim 1, wherein:

the first time period occurs over a 12 hour period;

the second time period occurs over a 2 hour period;

the third time period occurs over a 1 hour period; and the fourth time period occurs over a 9 hour period.

6. The method for suppressing greening according to claim 1, wherein:

the first time period occurs over a 12 hour period;

the second time period occurs over a 6 hour period;

the third time period occurs over a 1 hour period; and the fourth time period occurs over a 5 hour period.

7. The method for suppressing greening according to claim 1, wherein:

the first time period occurs over a 12 hour period;

the second time period occurs over a 4 hour period;

the third time period occurs over a 2 hour period; and the fourth time period occurs over a 6 hour period.

8. The method for suppressing greening according to claim 1, wherein:

the first time period occurs over a 4 hour period;

the second time period occurs over a 4 hour period;

the third time period occurs over a 1 hour period;

the fourth time period occurs over a 6 hour period;

a fifth time period, in which the far-red light is not irradiated and the light of the wavelength region other than the far-red light is not irradiated, occurs over a 9 hour period.

9. The method for suppressing greening according to claim 1, wherein:

the light of a wavelength region other than the far-red light comprises red light.

10. The method for suppressing greening according to claim 1, wherein:

the potato tuber is one of a Dansyaku or a Nishiyutaka.

* * * * *